April 12, 1949.  E. F. ROSSMAN  2,467,098

PISTON FOR HYDRAULIC SHOCK ABSORBERS

Filed Dec. 13, 1945

INVENTOR
EDWIN F. ROSSMAN
BY
HIS *Spencer, Hardman & Fehr*
ATTORNEYS

Patented Apr. 12, 1949

2,467,098

UNITED STATES PATENT OFFICE 2,467,098

PISTON FOR HYDRAULIC SHOCK ABSORBERS

Edwin F. Rossman, Dayton, Ohio, assignor to General Motors Corporation, Detroit, Mich., a corporation of Delaware Application December 13, 1945, Serial No. 634,800

1 Claim. (Cl. 277—45)

This invention relates to improvements in hydraulic shock absorbers and particularly to the piston thereof.

It is among the objects of the present invention to provide an hydraulic shock absorber with a simplified piston having fluid flow passages and control valves for controlling the flow of fluid from one side of the piston to the other as the piston moves in one direction or the other respectively.

Further objects and advantages of the present invention will be apparent from the following description, reference being had to the accompanying drawings wherein a preferred embodiment of the invention is clearly shown.

Figure 1:
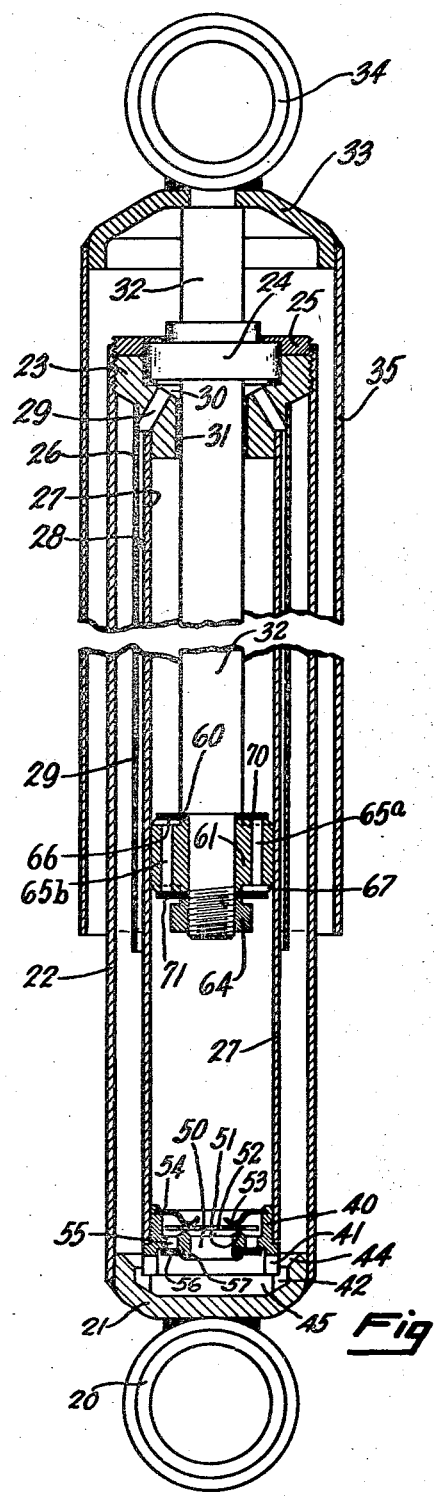
Fig. 1 is a longitudinal sectional view of the shock absorber equipped with the present invention.

Referring to the drawings, the numeral 20 designates the attachment ring of the shock absorber which may be attached to the axle of a vehicle when the shock absorber is installed between the axle and frame of the vehicle to control the movements of those members of the vehicle. This ring 20 is attached to the end cover 21 in any suitable manner, preferably by welding. One end of a tube 22 is secured to the end cover 21, the other end of said tube being interiorly threaded to receive the end head 23. The tube 22 forms the fluid reservoir of the shock absorber. The outer surface of the end head 23 is recessed to receive and hold the packing gland 24. A retainer ring 25 is threaded into the end of the tube 22 and abuts the packing gland 24 rigidly to hold it in position in the tube.

The end head 23 has two portions of different diameters inside the tube 22, both of lesser diameter than the threaded portion of the end head received by the tube 22. The intermediate diameter portion of the end head has the end of the tube 26 fitting tightly about it. The smallest diameter portion of the end head has one end of tube 27 fitting tightly about it. This tube 27 forms the working cylinder of the shock absorber. The annular space 28 formed between the cylinder tube 27 and tube 26 has its lower end opening into the reservoir space 29 between the cylinder tube 27 and tube 22 and below the lowest operating level of the fluid therein. The other end of space 28 is in communication with a space 30, directly beneath the packing gland 24, by passages 29 in the end head 23.

A sleeve bearing 31 is press-fitted in a central opening in the end head 23. The piston rod 32 is slidably supported by the bearing 31 and extends through the packing gland 24. To the end of the piston rod 32, extending beyond the packing gland 24 there is secured an end cover 33 and outside said cover a mounting ring 34. This ring, preferably welded to the cover 33 and to the piston rod 32 is attachable to the frame of the vehicle. A tube 35, of greater diameter than tube 22, and thus telescoping it, has its one end secured to the end cover 33 and forms a dust cover protecting the piston rod 32 and packing gland 24 against dirt and dust.

The end of the cylinder tube 27, opposite the end head 23, has a valve-cage 40 attached thereto. Open, depending lugs 41 on the valve-cage seat in open lugs 42 in the interior of the end cover 21. These open lugs 41 and 42 rigidly hold the cylinder tube 27 concentric of tube 22 while providing fluid passages 44 permitting communication between the reservoir space 29 and the space 45 beneath the valve-cage 40.

A central opening 50 in the valve-cage connects the interior of the cylinder tube 27 with the space 45. An annular ridge forming a valve-seat 51 on the side of the valve-cage inside tube 27, surrounds the opening 50. A disc-valve 52 is yieldably urged into engagement with valve-seat 51, by spring fingers 53 provided by ring 54 secured in the valve-cage. A plurality of openings 55 in the valve-cage, arranged in a circular row around the valve-seat 51 also connect the interior of the cylinder tube 27 with space 45. The flow of fluid through said openings 55 is controlled by a resilient disc-valve 56 consisting of one or more ring discs fitting about a depending portion of the valve-cage around opening 50 therein and urged into engagement with the valve cage to close the openings 55 by spinning the edge of the depending portion over the valve-disc as at 57. The degree of pressure at which the valve-disc is urged upon the valve-cage is controlled by the spinning over of edge 57.

Figure 2:
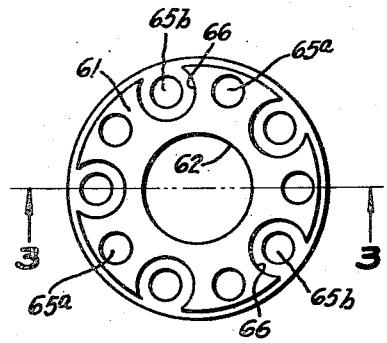
Fig. 2 is an end view of one form of piston.
Figure 3:
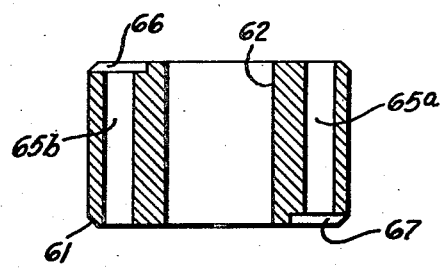
Fig. 3 is a transverse, sectional view taken along the line 3—3 of Fig. 2.

Passing through the packing gland 24 and sleeve bearing 31, the piston rod 32 extends coaxially into the cylinder tube 27. This end of the piston rod has a reduced portion partly threaded, thus forming a shoulder 60. The piston 61 has a central, axial opening which fits over the reduced diameter of the shaft and the nut 64 secures the piston rod. A plurality of end-to-end through passages 65 are shown arranged in a circular row in the piston, said passages providing for the transfer of fluid from one side of the piston to the other as it is reciprocated in the cylinder tube 27. Alternate passages 65a have their respective termini open in the one end surface of the piston as shown in Fig. 2. The other, intermediate passages 65b each have a concentric counterbore on recess 66 in this same, one end surface of the piston so that these ends of the respective intermediate passages 65b terminate in a surface below the level of the said one end surface of the piston. Each counterbore or recess is of such a size that one side thereof is open and communicates always with the cylinder space. The passages 65b having a counterbore or recess at one end, have their opposite ends terminating in the opposite end surface of the piston while the passages 65a, terminating in the upper end surface of the piston, have similar counterbores as recesses 67 at their bottom or opposite ends, which recesses have an open side in communication with the cylinder space.

A fluid controlling disc-valve 70 consisting of one or more resilient spring discs, is clamped between the piston 61 and the shoulder 60 on the piston rod so that the valve rests normally upon the upper surface of the piston. This closes the fluid passages 65a but, due to the recesses 66, these upper ends of the passages 65b are always open to the cylinder space above the piston.

A similar disc valve 71 is clamped against the bottom surface of the piston by the nut 64. This valve 71 normally closes the bottom ends of passages 65b, but due to the recesses 67 at the bottom ends of passages 65a, they are always in communication with the cylinder space beneath the piston.

Figure 4:
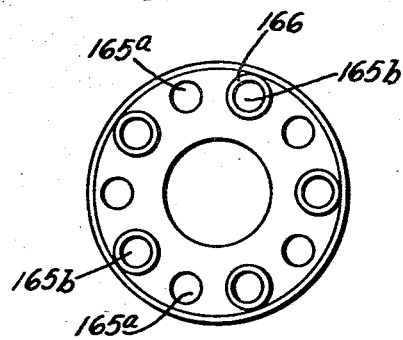
Fig. 4 is an end view of a modified form of piston.

The Fig. 4 illustrates a modified form of piston. Here the piston 161 has a central opening 162 and a plurality of end-to-end through passages 165. Alternate passages 165a terminate in the one end surface of the piston while ring-shaped extensions 166 on said surface surround the termini of the other, intermediate passages 165b. The end surfaces of the extensions 166 are in the same plane and provide valve-seats for a disc valve similar to valve 70 which would close all passages 165b at this end while passages 165a would be open constantly. At the other or bottom end of the piston the alternate passages 165 have the ring-shaped extension while passages 165b terminate in the end surface of the piston. A valve like 71 is used to engage the circular extensions at this end of the piston to close these ends of the passages 165a while passages 165b would be constantly open.

When the piston 61 is moved upwardly in the cylinder tube 27, fluid in the cylinder chamber above the piston will be forced into the open recesses 66 and through passages 65b against valve 71. Due to this fluid pressure, valve 71 will be actuated to move its outer portion from engagement with the piston for establishing a restricted flow into the lower cylinder chamber. This same piston movement creates a lower pressure in the lower cylinder chamber than exists in the reservoir space between tubes 22 and 27, thus fluid in the reservoir will move to lift valve 52 from its seat 51 and thus establish a flow through opening 50 into the lower cylinder chamber. Thus it will be seen that the fluid discharged from the upper cylinder chamber through the upwardly moving piston, together with the fluid from the reservoir entering the lower cylinder chamber through the opening 50 will fill said lower cylinder chamber with fluid.

On the other hand, when piston 61 is moved downwardly pressure is exerted upon the fluid in the lower cylinder chamber. Due to the fact that valve 70 is constructed to be actuated at a lower fluid pressure than valve 56, fluid entering recesses 67 and passages 65a in the piston will move said valve 70 to establish the first restricted flow from the lower cylinder chamber. Inasmuch as piston rod 32 extends into the upper cylinder chamber and therefore reduces its cubic capacity, all fluid displaced from the lower cylinder chamber cannot be received by the upper chamber. Therefore fluid pressure will actuate valve 56 to establish a restricted fluid flow from the lower chamber into the fluid reservoir.

Restriction to fluid flow by valves 70, 71 and 56 causes the shock absorber to resist any moving force directed thereupon.

From the aforegoing it may be seen that applicant has provided a shock absorber having a piston of simple structure and design, requiring minimum machining operations and very little assembly time. It provides transfer of fluid from one side of the piston to the other just as efficiently and quickly as do the more complicated and expensive piston structures.

While the embodiment of the present invention as herein disclosed constitutes a preferred form, it is to be understood that other forms might be adopted, all coming within the scope of the claim which follows.

What is claimed is as follows:

A valved piston consisting of a cylindrically shaped body the ends of which are chamfered, each end having a plurality of spaced recesses arranged in a single, circular row of equal diameter, the recesses in one end of the piston being equally staggered circularly relatively to the recesses in the other end of the piston, all of said recesses communicating with a respective chamfered surface of the piston; a plurality of through passages in the piston, arranged in a single, circular row of equal diameter to the circular rows of recesses and axially parallel to the axis of the piston, alternate passages terminating at one end in a recess and at the other end in the end surface of the piston between recesses therein; and disc valves yieldably urged upon the ends of the piston.

EDWIN F. ROSSMAN.

REFERENCES CITED

The following references are of record in the file of this patent:

UNITED STATES PATENTS

| Number | Name | Date |
| --- | --- | --- |
| 2,107,974 | Bechereau et al. | Feb. 8, 1939 |
| 2,316,924 | Whisler | Apr. 20, 1943 |
| 2,329,803 | Whisler | Sept. 21, 1943 |
| 2,335,907 | Boor et al. | Dec. 7, 1943 |